US 6,684,393 B1

(12) United States Patent
Loen et al.

(10) Patent No.: US 6,684,393 B1
(45) Date of Patent: Jan. 27, 2004

(54) COMPILATION METHOD AND SYSTEM TO REUSE MEMORY STORAGE INSTEAD OF ALLOCATING IT (75) Inventors: Larry W. Loen, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,036

(22) Filed: Jan. 29, 1999

(51) Int. Cl.[7] .............................................. G06F 9/45
(52) U.S. Cl. ....................... 717/151; 707/206
(58) Field of Search .................. 709/104; 711/154; 707/206; 717/151–161

(56) References Cited

U.S. PATENT DOCUMENTS

| 4,775,955 | A | | 10/1988 | Liu | 364/900 |
| 5,535,390 | A | * | 7/1996 | Hildebrandt | 709/312 |
| 5,715,430 | A | | 2/1998 | Hirayama | 395/468 |
| 5,724,588 | A | | 3/1998 | Hill et al. | 395/684 |
| 5,875,461 | A | | 2/1999 | Lindholm | 711/118 |
| 5,911,071 | A | * | 6/1999 | Jordan | 717/108 |
| 6,052,699 | A | | 4/2000 | Huelsbergen et al. | 707/206 |
| 6,112,025 | A | * | 8/2000 | Mulchandani et al. | 709/331 |
| 6,138,127 | A | * | 10/2000 | Pasch | 707/206 |
| 6,141,737 | A | | 10/2000 | Krantz et al. | 711/171 |

FOREIGN PATENT DOCUMENTS

| EP | 0913769 A2 | 5/1999 |
| JP | 8314943 | 11/1996 |

OTHER PUBLICATIONS

Frank Yellin, "The JIT Compiler API," Oct. 4, 1996.*
Smith, L. C., "Software Mecahnism to Reuse Object Instances for Improved Performance", IBM Technical Disclosure Bulletin, vol. 38, No. 10, pp. 237–241 (Oct. 1995).*
Baker, H., "CONS Should not CONS its Arguments, or, a Lazy Alloc is a Smart Alloc", *ACM Sigplan Notices*, vol. 27, No. 3, pp. 24–34 (Mar. 1992).
Baker, Jr., H., "Optimizing Allocation and Garbage Collection of Spaces", *Artifical Intelligence, An MIT Perspective*, vol. 2, pp. 391–396 (1979).

(List continued on next page.)

R. Klemm, "Practical Guidelines for Boosting Java Server Performance," Proceedings of ACM 1999 Java Grande Conference, Pp 25–34, Jun. 14, 1999.

*Primary Examiner*—John Follansbee
*Assistant Examiner*—Li Zhen
(74) *Attorney, Agent, or Firm*—Roy W. Truelson (57) ABSTRACT

The present invention is a method and system of reusing a local memory space in a computer. In accordance with the invention an incoming stream of computer instructions is analyzed by an executable module to determine the presence of a first predetermined operator in the stream of computer instructions. If the first predetermined operator is present, the present invention determines the value of a parameter following the first operator in the stream and the executable module interposes a second operator in place of the first operator and reuses a local memory space to store an instance of the parameter in the memory space in response to the execution of the second operator.

29 Claims, 6 Drawing Sheets

OTHER PUBLICATIONS

Bozman, G. et al., "Analysis of Free–Storage Algorithms—Revisited", *IBM Systems Journal*, vol. 23, No. 1, pp. 44–64 (1984).

Matsuoka, S. et al., "A Fast Parallel Conservative Garbage Collector for Concurrent Object–Oriented Systems", *IEEE*, pp. 87–93 (1991).

McDowell, C.E., "Reducing Garbage in Java", *ACM SIGPLAN Notices*, vol. 33, No. 9, pp. 84–86 (Sep. 1998).

Monson, L., "Caching & WeakReferences", *JAVA Developer's Journal*, vol. 3, Issue 8, pp. 32–36 (Date Unknown).

Park, Y. et al., "Escape Analysis on Lists", *ACM SIGPLAN '92*, pp. 116–127 (1992).

Smith, L.C., "Software Mechanism to Reuse Object Instances for Improved Performance", *IBM Technical Disclosure Bulletin*, vol. 38, No. 10, pp. 237–241 (Oct. 1995).

Wilson, P. et al., "Dynamic Storage Allocation: A Survey and Critical Review", *Department of Computer Sciences, University of Texas at Austin*, pp. 1–78 (Date Unknown).

"Java Platform 1.2 API Specification: Interface ResultSet," http://www.javasoft.com/products/jdk/1.2/docs/api/java/sql/ResultSet.html, downloaded May 17, 1999, 46 pages.

"Java Platform 1.2 API Specification: Class Hashtable," http://www.javasoft.com/products/jdk/1.2/docs/api/java/util/Hashtable.html, downloaded May 17, 1999, 10 pages.

W. H. Lee et al., "Evaluation of a High–performance Object Reuse Dynamic Memory Allocation Policy for C++ Programs," vol. 1, pp. 386–391, High–performance Computing in the Asia Pacific Region Proceedings, May 14–17 2000.

D. Wiebe, "A Distributed Repository for Immutable Persistent Objects," OOPSLA 86, Oct. 2, 1986, pp. 453–465.

\* cited by examiner

COMPILATION METHOD AND SYSTEM TO REUSE MEMORY STORAGE INSTEAD OF ALLOCATING IT

FIELD OF THE INVENTION

The invention relates generally to a method and system of optimizing local memory usage in a computer system. More particularly the invention relates to a method and system for enabling a computer to reuse an amount of memory instead of allocating a different portion of the memory.

BACKGROUND

Common idioms in the JAVA programming language often lead to performance problems when the underlying JAVA code is executed. Such performance problems cause a varying, but often significant performance deficit.

Specifically, source code segments written in an object oriented programming language such as C++ will typically conform to the pattern set forth in TABLE 1.

TABLE 1

C++

```
AppObject some;
AnyObject x(create,with,parms);
while (some.WorkToDo( )) { // at least one more of
some list of work associated with "some"
    some.SourceofNextAnyObject(x); // x's storage is
altered to new values
    some.DoworkWith(x); // x might be used, put on
other list within "some"
};
```

In contrast, source code segments written in an object oriented programming language, such as JAVA, will typically conform to the example set forth in TABLE 2.

TABLE 2

JAVA

```
AppObject some;
while (some.WordToDo) { // at least one more of some
list of work assoc. with "some"
    AnyObject x = new
AnyObject (some.SourceofNextAnyObject ( ));
    // x's old storage abandoned, replaced with new
storage initialized from "some"
    some.DoworkWith(x); // might be used, put on other
list within "some"
};
```

The differences between the two source code segments are subtle in the text, but are rather profound in terms of the underlying executable code. For example, in C++ only one storage copy is associated with "x". This is illustrated in FIG. 2B where it is shown that: when executing "AnyObject x(create, with, parms)" in C++, x will be allocated over a single object instance at 78 within memory space 76. On every loop, instead of allocating a new object instance, the function "some.SourceofNextAnyObject(x)" reinitializes 78 to new values and reuses the memory space. Thus, the various memory blocks 80 in memory space 76 are never used by the loop and can be used by other processes.

Figure 2A:
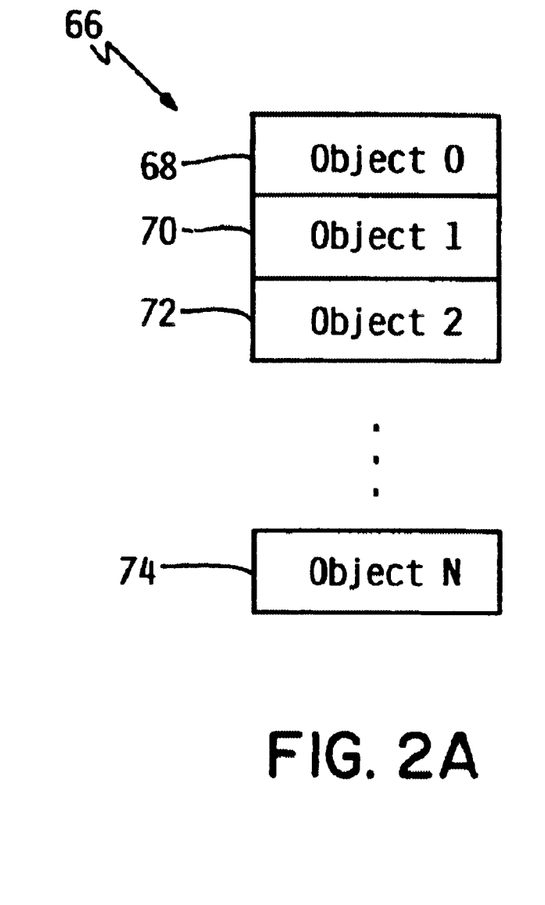
FIGS. 2A–B are illustrations of sections of memory which have been allocated for storing an object.
Figure 2B:
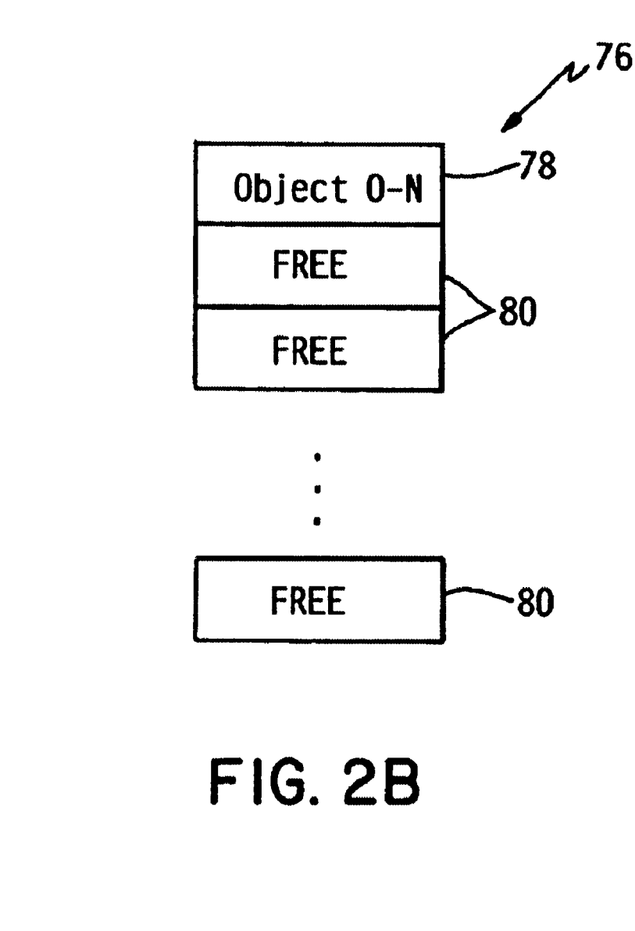

As illustrated in FIG. 2A, however, in JAVA "x" is a reference to a series of objects stored in memory space 66. Each time the loop is executed, a new "instance" of x is created. As a result, the "new" operator of the JAVA language instantiates a new object, or creates a new object, by allocating memory for the new object each time "new" is encountered. By way of example, during a first execution of the loop, a memory storage space 68 is allocated for Object 0. Subsequently Object 0 is stored in memory storage space 68. Similarly, memory storage space 70 is allocated for Object 1, which is subsequently stored in that memory storage. This iterative process continues until N new objects have been created and an Nth memory storage space 74 has been allocated for storing Object N. Those of skill in the art will appreciate that the memory storage for each new instantiation of an object need not lie in a contiguous memory space. Instead, the memory storage space(s) may be allocated wherever adequate memory space is located.

In the preceding example, if the loop iterates 20,000,000 times, then the memory space to hold the object is allocated 20,000,000 times. This would amount to a 20,000,000 to one deficit for JAVA to overcome as compared to C++. The number of times that the loop iterates varies in practice. Therefore, the deficit will vary with the iterations and the application of the program.

It will also be appreciated that the processor deficit may not be noticed if the function DoWorkWith executes enough instructions. However, the problem associated with allocating a new memory space each time an object is encountered in an iterative loop is sufficiently pervasive that the function DoWorkWith may have other circumstances that repeat the above illustrated practice. Namely, memory for another object may be allocated on a "once per loop" basis within DoWorkWith itself. Regardless of whether a processor deficit is noticed, a storage deficit exists.

Therefore, there is a need for a method and system for optimizing the memory space allocated for each new instance of an object by reusing a previously created memory space (when possible) instead of allocating a new memory space for the object during the execution of a loop.

SUMMARY

The present invention relates generally to a method and system for optimizing local memory storage in a computer. More specifically, the present invention relates to reusing local memory storage for each instance of an object that is created within an iterative loop instead of reallocating a new memory space "once per loop."

As noted above, JAVA has a performance deficit compared to other languages (C, C++, RPG, etc.) in that it tends to allocate many short-lived objects on a "once per loop" basis rather than a "once per job" basis. The other languages do "once per job" more often. Because there can be a very large number of loop iterations, the cost of creating and garbage collecting all of these objects (many of which only "live" for a few JAVA statements or at most, one loop iteration) can be very high. The present invention provides a system and method for optimizing the memory allocation by reducing the allocation cost for that loop from "once per loop" to "once per job."

Those skilled in the art will readily understand that a garbage collector in JAVA cleans the dynamic memory when it is needed and there is available time. The garbage collector marks objects throughout the memory space to which there are references and subsequently removes the unmarked ones. Garbage collection is necessary to limit JAVA's storage costs. If objects are created on a "per loop" basis and there are a large number of loop iterations, the main storage cost is unacceptable compared to other languages (e.g., without the garbage collection process). But garbage collection is costly in terms of processor time. Also, since garbage collection runs occasionally, there is a time lag between when any particular object ceases to be in use and when garbage collection next executes. Within this lag or time between collections, storage is wasted. Therefore, while garbage collection keeps the worst case storage deficit far below the example deficit identified above, a substantial storage and processor deficit remains compared to alternative languages.

In accordance with a preferred embodiment, the present invention provides a method of reusing a local memory space in a computer. The method comprises analyzing an incoming stream of computer instructions with an executable module and determining the presence of a first predetermined operator in said stream of computer instructions. If said first predetermined operator is present, the method determines the value of a parameter following said first operator in said stream. If said first predetermined operator is present, the method interposes a second operator in place of said first operator by said executable module and reuses a local memory space to store an instance of said parameter in said memory space in response to the execution of said second operator.

In another embodiment, the present invention provides a method of optimizing the usage of a memory space in a computer while executing a module wherein a new instance of an object is created within each execution of an executable loop. The method comprises reusing said memory space for each new instance of said object created each time said loop is executed whereby said memory space is reclaimed without garbage collecting and is reused without allocating a new memory space.

In still another embodiment, the present invention provides, a computer system. The system comprises a memory configured and arranged to store an object and a processor associated with said memory executing an executable module in said computer having a portion that analyzes an incoming stream of computer instructions.

In yet another embodiment, the present invention provides a program storage device readable by a computer system, it the program storage device tangibly embodying a program of instructions executable by the computer system to perform a method of reusing a local memory space in a computer. The method comprises analyzing an incoming stream of computer instructions with an executable module and determining the presence of a first predetermined operator in said stream of computer instructions. If said first predetermined operator is present, determines the value of a parameter following said first operator in said stream, interposes a second operator in place of said first operator by said executable module and reuses a local memory space to store an instance of said parameter in said memory space in response to the execution of said second operator.

In a further embodiment, the present invention provides a method of transmitting a program product to a computer system. The method comprises: (a) establishing a connection with the computer system; and (b) transmitting the program product being executable by the computer system a method of reusing a local memory space in a computer. The method comprises analyzing an incoming stream of computer instructions with an executable module and determining the presence of a first predetermined operator in said stream of computer instructions. If said first predetermined operator is present, determines the value of a parameter following said first operator in said stream, interposes a second operator in place of said first operator by said executable module and reuses a local memory space to store an instance of said parameter in said memory space in response to the execution of said second operator.

These and various other features as well as advantages of the present invention will become readily apparent to those skilled in the art from the following detailed description and corresponding drawings. As will be realized, the invention is capable of modification without departing from the invention. Accordingly, the drawings and description are to be regarded as being illustrative in nature, and not as restrictive.

BRIEF DESCRIPTION OF THE DRAWINGS

In the Drawings like parts are referenced by like numerals throughout the several views.

DETAILED DESCRIPTION

The principles of the present invention apply particularly well to reducing wasted storage space in a programming language. A preferred application for this invention is in a computer environment running the JAVA programming language. Other programming languages may suffer from the same drawback, however, and so the principles of the present invention may be employed in other environments.

In a preferred embodiment constructed in accordance with the principles of the present invention, a compilation system and method for reusing a local memory space for each instance of an object is provided. In the JAVA programming language environment this works especially well with "Just In Time" compilers (JIT). However, it could also work with other JAVA compilers. Both can be viewed as translating JAVA's byte-codes into instruction streams, restricted (in theory) by certain rules of the language. Examples of a particular restriction are the rules associated with accounting for classes that are children of any given class which might be loaded and used later in the execution.

Figure 1:
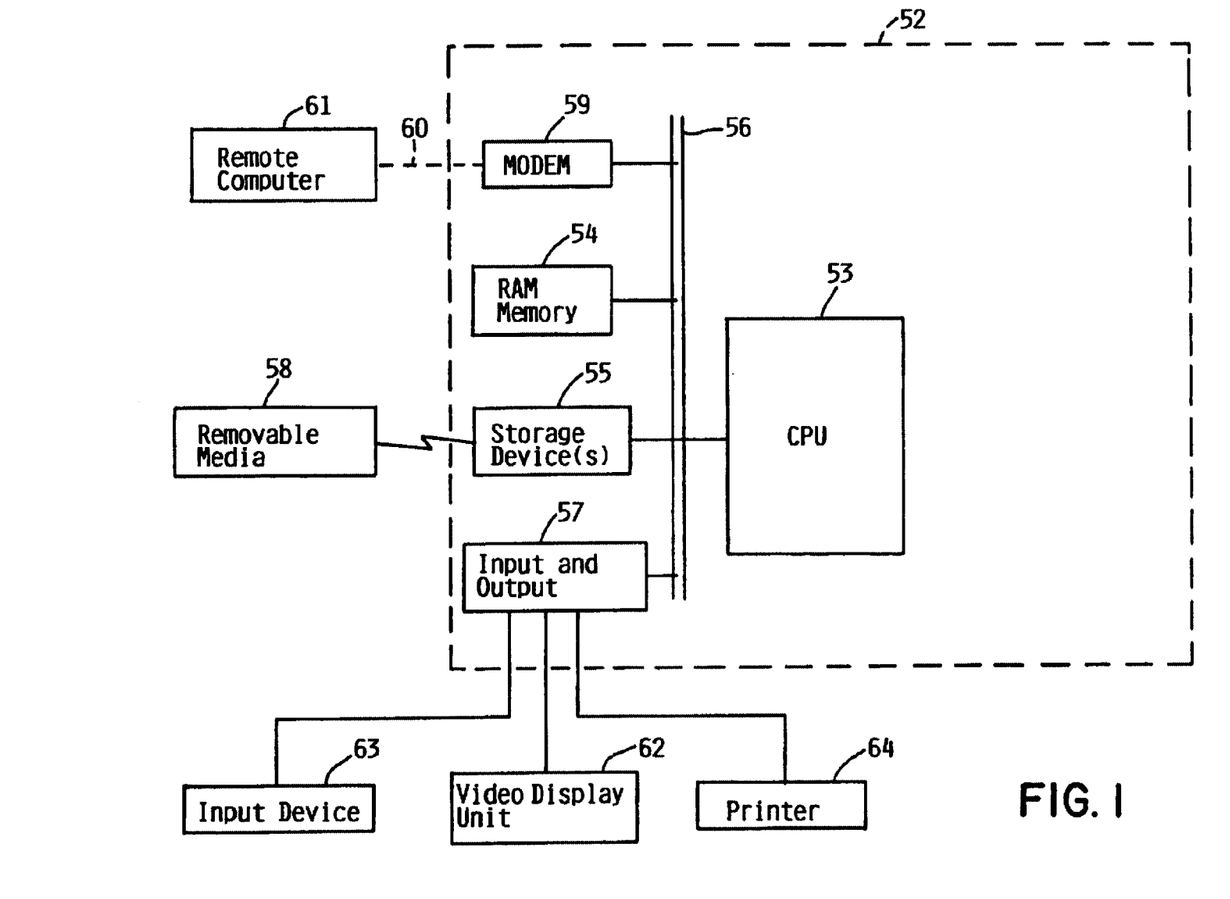
FIG. 1 is a functional block diagram of a computer device forming an environment in which the present invention may be employed.

A further description of the present invention will now be deferred pending a brief description of the computer system illustrated in FIG. 1 in which the present invention may be employed. Computer 52 is preferably of the IBM or IBM compatible type (such as a personal computer with a Pentium chip). The operating software of such a system is preferably of the Windows 3.11, Windows 95 or Windows NT versions. However, other operating systems might be employed (e.g., Mcintosh operating systems, OS/400, etc.).

The computer 52, generally includes one or more CPUs 53 with random access memory (RAM) 54, a longer term memory storage device 55 (such as floppy disk, hard drive, or CD-style media), and such other attendant and peripheral devices so as to allow the processor to operate in its intended manner. Removable media 58 may be a floppy disk, CD-ROM, etc. and is preferably used in combination with the longer term memory storage unit 55. The CPU 53 communicates with the memory devices via bus 56.

In the event that a remote computer(s) 61 is attached, then the CPU 53 is able to communicate to remote computer(s)

61 through network card or modem device 59 and line 60. The line 60 may be hard-wired, may be a network connection, or may be a wide-area network connection over a leased or public phone line. It will also be appreciated that line 60 may include wireless communications devices. Use of a remote computer 61 may be beneficial to end-users, a supervisor or programmer may directly control computer 52 from a remote location, and/or it may provide for downloading of information, programming and/or diagnostics.

The IO device 57 provides output for the visual display unit (VDU) 62. The VDU is preferably a cathode ray tube-style (CRT) display device. However, liquid crystal displays and other well known display devices might be employed. Operator input devices such as a keyboard, track ball and/or mouse are provided at 63. A printer or other output device is provided at 64.

Figure 3A:
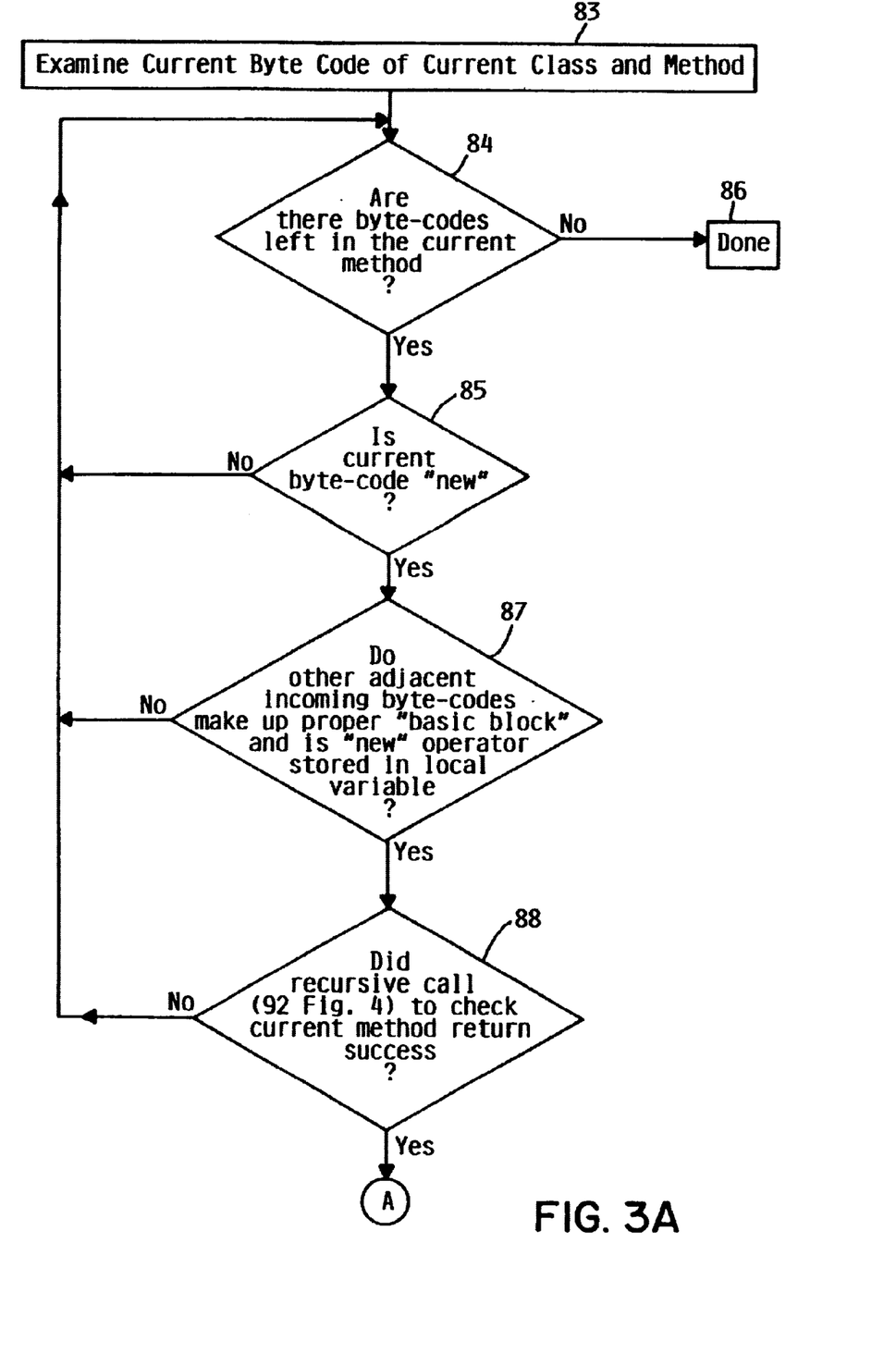
FIG. 3 is a logic flow diagram illustrating the steps utilized to implement one embodiment of the present invention.
Figure 3B:
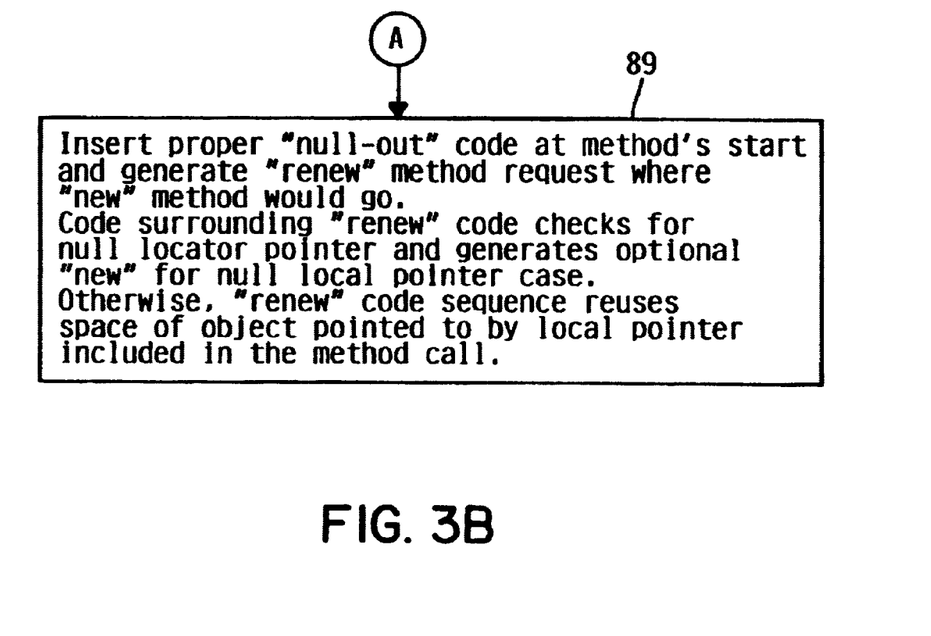

Turning now to FIG. 3, a high level logic flow diagram is provided illustrating the steps which may be used in a software implementation of the method and system of the present invention. As illustrated, the process begins at block 83 where the compiler analyzes an incoming stream of byte codes. In JAVA, byte-codes are platform independent and may be transferred across computer networks (e.g., Local Area Networks, Internet, etc.) or executed on a local computer instead of a central server computer.

An application written in JAVA is initially compiled by a JAVA compiler to an intermediate form that is referred to as byte-code. JAVA byte-codes are pseudo-code representations of a JAVA application program that is totally independent of which computing-platform architecture it is running on. When a JAVA enabled platform receives the byte-codes, they are interpreted by a JAVA Virtual Machine or, if present, a JIT compiler. The JIT compiler compiles each line of byte-code directly into machine code that is compatible with the underlying computing platform architecture while the JAVA program is executing.

When a JIT compiler is present, the JAVA Virtual Machine reads a class file for interpretation and then passes the file to the JIT for interpretation. The JIT then takes the byte-codes and compiles them into native code of the machine on which they reside. The JIT compiler is an integral part of the JAVA Virtual Machine (JVM) and is generally not noticed—except that the JAVA code generally executes faster.

In a JIT compiler, it is possible to keep track of new JAVA classes that are loaded at a later time. Everything in JAVA, except for the basic types, has to be a class. In object-oriented programming languages it is feasible to have several or many objects of the same kind share certain characteristics. Because objects of the same kind are similar, a programmer can create blueprints for those objects. A class is a blueprint or prototype that defines the variables and methods common to all the objects of the same kind that share certain characteristics. These software "blueprints" for objects are called classes.

Keeping track of classes also allows relationships to be tracked. JAVA's inheritance structure makes this relatively easy. Therefore, a JIT compiler can perform certain optimizations that appear to violate the standards of the language as long as it is willing to dispose of its currently generated code, since currently generated code is not stored persistently, and specifically repeat the compilation of a parent class when a child class shows up that requires the full rules of the language to be respected.

This concept is most clearly seen in Virtual Function Calls. In JAVA, unless a class is declared as "final" a special table lookup must be done for the functions within the class. This is required because a child may show up later and the Virtual Function Call will find the child's version of the same function instead of the parent version even if the object's pointer appears to be that of the parent. This is standard polymorphism. It allows one apparent procedure name to be redefined in the context of different objects, determined by parent/child relationships and the run-time identity of the object. For example, polymorphism allows the definition of a general operation like "draw" to mean one thing if the "DrawingObject" is a Circle and another thing if the "DrawingObject" is a Square. Furthermore, polymorphism allows accessing a general class of operations in the same manner while particular actions that are associated with each operation differ. However, in a JIT compiler, if no child is present, it can speculatively assume that the class is final and generate a higher performance Non Virtual Function Call.

The JIT/compilation process begins by reading all associated byte codes of a class (not shown). The byte codes can be divided into "basic blocks" by means well-known in the art. To generate code thereafter, the compiler examines each byte code starting at code block 83. The invention presumes that a separate pass is being made to change the internal copy of the byte-codes depending on whether or not a "renew" can be achieved. This type of internal byte-code transformation prior to generating the final code is well known and common in the art. It may be possible to combine the "separate pass" described herein with other existing types of "passes" known in the art.

Code block 83 begins examination of the current method by moving to 84 and determining whether any byte-codes remain unexamined. If there are unexamined byte-codes, a check is made at 85 to determine if "new" is being used. If "new" is not being used, the pass "iterates" and examines the subsequent byte-code at 84. If 85 finds a "new" operation, the surrounding byte-codes are examined to determine whether the "new". is in a suitable "basic block" (e.g. within a simple "for" loop) and thus eligible for a more complex optimization at 87. It will be appreciated that this determination will vary according to the specific embodiment of the invention. If "new" is not in a suitable "basic block" the standard code generation will eventually be made and the process once again loops to 84. If it is determined that using "renew" is desirable, the current routine is set to this particular class and method and the process performs the recursive safety check illustrated in FIG. 4. If that function returns success 88, then the proper byte-codes are generated to replace "new" with "renew" in block 89. If the safety check failed, the process loops to 84.

Figure 4A:
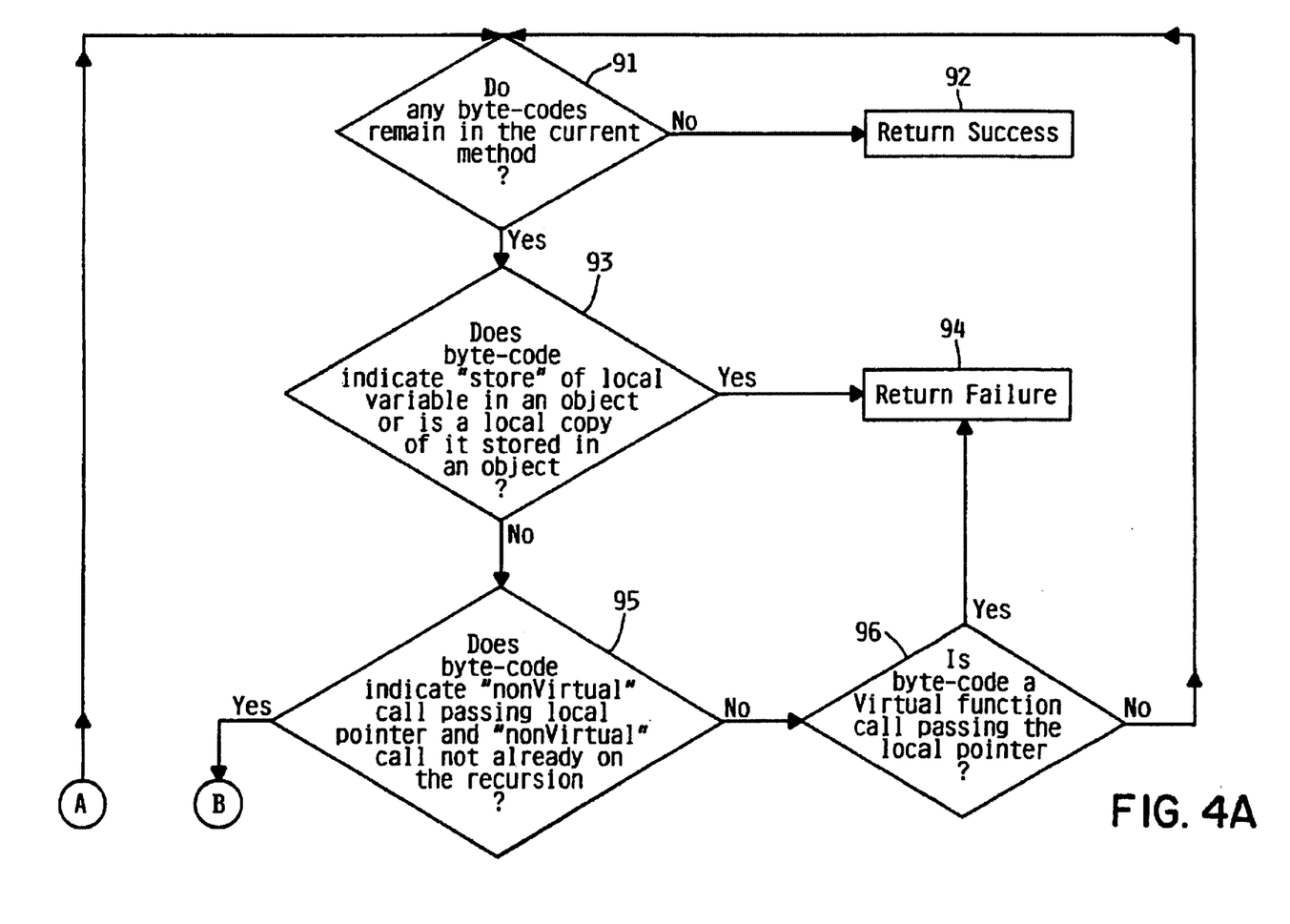
FIG. 4 is a logic flow diagram illustrating the steps utilized to implement a recursive safety check in one embodiment of the present invention.
Figure 4B:
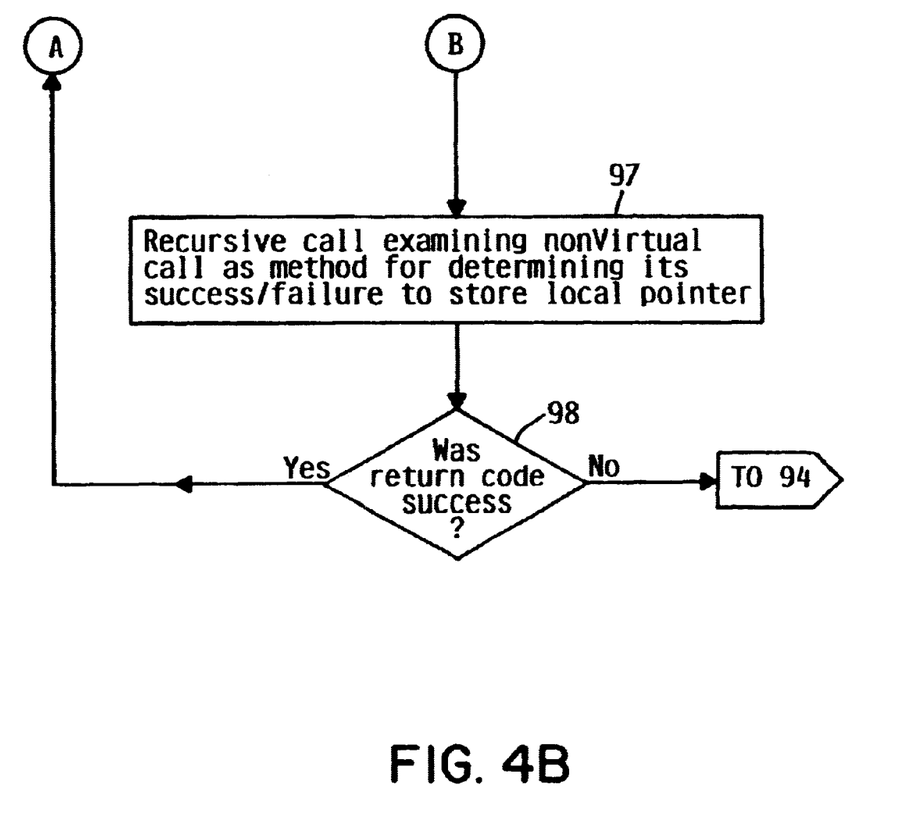

Referring now to FIG. 4 the "safety check" in accordance with the principles of the present invention is shown. Those skilled in the art will appreciate that other more complex "safety checks" may also be performed. The first check at 91 determines how many byte-codes remain in the current method. If all of the byte codes of the current method have been examined, "success" is returned at 92 to check block 88 (FIG. 3). The check at 93 is performed if there are any byte-codes remaining in the method. This check determines if the local variable, in its existing form, was stored outside a valid memory range.

In a simple implementation, the check at 93 is any storage of the local variable itself. In a more aggressive implementation, storage of the local variable to other local variables is tracked. The exception being that all the variables involved must then be checked at 93. This includes implicit copies made when the local pointer is a subroutine parameter.

If a store is discovered at 93 (the check must be "conservative"; regardless of the embodiment, it can register unnecessary failure but never false success), the "failure" value is returned to the previous caller. If no such store is discovered, the byte-code is checked to see if it is a nonVirtual function call. If the byte-code is a nonVirtual function call, and if the local variable is passed as a parameter 95, a recursive call at 97 uses the nonvirtual class and method for a recursive check of it to ensure that the nonVirtual function call does not also store the local pointer somewhere.

In very aggressive optimizations, all calls may have to be checked regardless of whether they pass the local pointer. For example, if the optimization also tries to find objects who live only for the duration of the original method, stores of any relevant local variable to that object must also be tracked and methods may reference them without a direct parameter. If the byte code is not a nonVirtual function call, the byte-code must be checked to determine if it is a Virtual function call 96 which passes the local pointer as a parameter. In this embodiment, where only local pointer(s) are being tracked, the local pointer is presumed stored unsafely by the virtual functional call so as to ease analysis. Therefore, if it is such a call, failure is returned via block 94.

What has been described above is a conservative technique that avoids more complex code. Those skilled in the art will appreciate that a list of such virtual function calls including the parent and its children can be realized and subsequently such list of functions may be subjected to a recursive set of checks for stores of the local pointer. If very aggressive attempts are made to track some stores into objects, and not just local variables, then all Virtual function calls would have to be examined the same way as described for aggressive optimizations in the nonVirtual case.

If either nonVirtual or Virtual function otherwise qualify to be checked, they may be omitted when their code was already under review. This ensures termination of the recursion. The end result examines the "transitive closure" of all routines called by the original method for stores to "unsafe" places."

In the preferred embodiment, the safety check is conservative. Unless a very aggressive technology like "Hot Spot" is used, the compilers will tend to reject the "renew" optimization for code illustrated in TABLE 3.

TABLE 3 if (debug_flag_true) debu_array[slot++]=x

In this case, the compiler will be unable to optimize x because the generated code will assume that the "debug_array[slot++]" might be taken and therefore a reference to object x would survive the call.

A "Hot Spot" JIT may determine that the variable debug_flag_true doesn't change state. Therefore, it will eliminate all the code in the example above, at least until someone sets debug_flag_true. However, even "Hot Spot" JIT may not always make this conclusion for several reasons. For example, debug_flag_true would have to be likely to be false for all object instances.

While this conservatism theoretically reduces the value of the optimization, additional stores to an object will tend more often than not to "always happen" or "never happen" on a given set of paths. That is, the object in question will tend to be either "stuffed" into some list of objects or "not stuffed" into such a list. Moreover, the "not stuffed" case should predominate, so the optimization can be achieved in many cases. This also assumes that the compiler can cope with the amount of work involved to study all of the pathways. However, when complicated pathways are encountered, the compiler may conservatively "give up" to save compilation time and complexity.

The presence of a JAVA Native Interface (JNI) is also a complication. JNI is non-JAVA code invoked from JAVA (equivalent to assembly language in other compilers). If somewhere along the call tree of DoWorkWith, a JNI is called and x might be fetched or stored by it (directly or indirectly), then the compiler will have to make x ineligible for the optimization. Hence, a JNI can already affect existing optimizations. It will be appreciated that compilers and JITs sometimes already make relatively non-conservative assumptions about JNIs being "well behaved." Unfortunately, JNIs will often be included in the call tree, so a decision about them is a key design trade-off. A compromise which appears to be acceptable is that if it does not have access to the object pointed to by x in a parameter, then it is ordinarily safe to assume that it does not store x somewhere that survives the JNI call. If such assumptions are made, turning this optimization on and off on the "JAVA" invocation may be required. Note that the JNI (or anything else) referencing x is not the issue per se. The issue is whether a reference to x is stored away in a place that persists after the call returns.

To produce the "renew" function, which the JAVA programmer never provided as a programming instruction, the compiler must perform certain "safety" checks. As illustrated in terms of the previous example, there must be no remaining references to the object. In JAVA terms, x must never have appeared on the right hand side of an assignment statement where the left hand side, regardless of what it was, could possibly still be a "live" object.

If the object is not null and there is enough memory storage space in the local computer, then memory is reused and returned "as if" it were newly allocated. The byte-code following the allocation proceeds normally to initialize what appears to be a new object but, in fact, is a reuse of an old object. This is normal constructor logic, defined by the object's owner. Those skilled in the art will recognize that instantiating an object requires that the "new" operator instantiates a class by allocating sufficient memory for a new object of that type. The "new" operator requires an argument which is a call to the constructor. The constructor, provided for by the JAVA programming language, is used to initialize the object of that type. Accordingly, the "new" operator creates the object, and the constructor initializes the object. Renew works in the same manner, except that it reuses the space provided by the added parameter.

Those skilled in the art will appreciate that while the preceding is sufficient for conventional compilation, there is an additional problem for JIT. The code as described can be generated for "non-final" classes, without complication, but if used in non-final methods, there is a potential complication. If the class or the method being analyzed as described herein is not "final," or any method recursively examined is not "final," subsequent execution might provide that a child class will be added later in the execution after a given method has had code processed by a JIT in accordance with the principles of the present invention. In many cases, this will not matter. However, the recursive method would have had to contend not only with the obvious method of the example DoSomethingWith( )but also all child classes of the declared parent that defined DoSomethingWith( ) differently. When a new child arrives later on in execution, post-JIT, that new method must be analyzed to see if it affects any of the optimizations in this method. If they store a reference to the object, then the originally processed JIT code must be changed to abandon the "renew" function logic.

In a multi-threaded system, this also means ensuring that outstanding partial execution is accounted for. Therefore, when this method is employed, sufficient information must be kept in order to redo the JIT process for affected methods whenever a dynamic load takes place. There are means known to the art that can, for example, overwrite the original JIT code with a branch to new code. If that is appropriately done, then outstanding execution is accounted for, because prior to the new classes load, and use of the methods therein, the old code remains safe. Moreover, appropriate markings of this optimization can be kept so that a JIT reprocessing could be done.

Those skilled in the art will appreciate that it is impractical to hold the entire recursive call tree. More practically, however, would be to keep a list of locations where this optimization was successfully performed. Optimizations would be disabled as described above and any existing use would be reprocessed by a JIT after some specified number of new invocations. In most cases, the JIT reprocessing will be successful. However, this also suggests that this form of JIT should perhaps be deferred until experience would indicate the likelihood that no new classes will be loaded for this JVM execution. Current technology such as "Hot Spot," for example, suggests that the affordability and practicability of such record keeping for a JIT-based technology is probable.

The present invention has been described in its presently contemplated best mode, and it is clear that it is susceptible to various modifications, modes of operation and embodiments, all within the ability and skill of those skilled in the art and without exercise of further inventive activity. Further, while the invention has been described in connection with what is presently considered the most practical and preferred embodiments, it is to be understood that the invention is not limited to the disclosed embodiments, but on the contrary, it is intended to cover various modifications and equivalent arrangements included within the spirit and scope of the appended claims.

What is claimed is:

1. A method of reusing a memory space in a computer, the method comprising:
   analyzing an incoming stream of computer instructions with an executable module;
   determining the presence of a first predetermined operator within a loop in said stream of computer instructions, said first predetermined operator allocating an unallocated portion of said memory space upon execution;
   if said first predetermined operator is present, determining the value of a parameter following said first operator in said stream;
   interposing a second operator within said loop in place of said first operator by said executable module; and
   reusing the same allocated portion of said memory space to store an instance of said parameter in said allocated portion of said memory space in response to the execution of said second operator during each iteration of said loop, wherein said allocated portion of said memory space is reused as multiple instances of said parameter are created without allocating a new memory space for each said new instance of said parameter.

2. The method according to claim 1, further including performing a safety check on the incoming stream of computer instructions.

3. The method according to claim 1, further comprising:
   determining whether there is sufficient memory available in said memory space to store said current instance of said parameter.

4. The method according to claim 1, wherein said executable module is a compiler computer program.

5. The method according to claim 4, wherein said executable module is a JAVA compiler computer program.

6. The method according to claim 4, wherein said compiler is a Just In Time compiler.

7. The method according to claim 1, wherein said stream of instructions is a stream of byte-codes.

8. The method according to claim 7, wherein said byte-codes are JAVA byte-codes.

9. The method according to claim 1, wherein said parameter following said predetermined operator is an object.

10. A method according to claim 1, wherein said allocated portion of said memory space occupied by said parameter does not require garbage collecting.

11. A method of optimizing the usage of a memory space in a computer, the method comprising:
    identifying a computer program module having a plurality of instructions for execution, said computer program module containing at least one loop and at least one first instruction within said at least one loop, said at least one first instruction specifying the allocation of a new instance of an object from said memory space within each iteration of said loop;
    replacing said at least one first instruction with at least one second instruction, said at least one second instruction reusing the same memory space for each new instance of said object created each time said loop is executed, said replacing step being performed automatically by said computer system; whereby said memory space is reclaimed without garbage collecting and is reused without allocating a new memory space.

12. The method according to claim 11, further comprising:
    determining if there is a sufficient amount of memory space available to store said object in said memory space prior to reusing said memory space.

13. The method according to claim 11 further comprising:
    recursively determining all objects potentially referenced by said object.

14. The method according to claim 12 further comprising:
    recursively determining all objects that potentially reference said object.

15. The method according to claim 11, further comprising:
    performing a safety check on the instructions of said computer program module.

16. A computer system, comprising:
    a memory configured and arranged to store an object;
    a processor associated with said memory executing an executable module having a portion that analyzes an incoming stream of computer instructions;
    said executable module identifying a loop within said stream of computer instructions and at least one first instruction within said loop which, upon execution, allocates an unallocated portion of said memory for an instance of a first object for each iteration of said loop;
    said executable module replacing said at least one first instruction with at least one second instruction which, upon execution, reuses the same allocated portion of said memory for an instance of said first object for each iteration of said loop.

17. The system according to claim 16, wherein said at least one second instruction being interposed by said executable module is hidden from the programmer.

18. The system according to claim 16, wherein said at least one second instruction acts to reuse a memory space previously allocated for an existing object.

19. The system according to claim 16, wherein said executable module performs a safety check prior to replacing said at least one first instruction with said at least one second instruction.

20. The system according to claim 19 wherein, in performing the safety check said executable module executes a transitive closure of all functions along a function tree called while said object is still in use.

21. The system according to claim 19 wherein, said executable module executes the transitive closure of the constructor used by said object.

22. The system according to claim 19 wherein, said executable module executes the transitive closure of any function using said object as an argument along said function tree.

23. The system according to claim 19 wherein, said executable module executes the transitive closure of any function called by said object along said function tree.

24. The method according to claim 16, wherein said instances of said first object are reclaimed without garbage collecting.

25. The system according to claim 16, wherein said executable module is a compiler.

26. The system according to claim 25, wherein said executable module compiler is a JAVA compiler.

27. The system according to claim 26, wherein said JAVA compiler is a Just In Time compiler.

28. A program storage device readable by a computer system, the program storage device tangibly embodying a program of instructions executable by the computer system to perform a method of reusing a memory space in a computer, the method comprising:

analyzing an incoming stream of computer instructions with an executable module;

determining the presence of a first predetermined operator within a loop in said stream of computer instructions, said first predetermined operator allocating an unallocated portion of said memory space upon execution;

if said first predetermined operator is present, determining the value of a parameter following said first operator in said stream;

interposing a second operator within said loop in place of said first operator by said executable module; and reusing the same allocated portion of said memory space to store an instance of said parameter in said allocated portion of said memory space in response to the execution of said second operator during each iteration of said loop, wherein said allocated portion of said memory space is reused as multiple instances of said parameter are created without allocating a new memory space for each said new instance of said parameter.

29. A method of transmitting a program product to a computer system, the method comprising:

(a) establishing a connection with the computer system; and (b) transmitting the program product being executable by the computer system to perform a method of reusing a memory space in a computer, the method comprising:

analyzing an incoming stream of computer instructions with an executable module;

determining the presence of a first predetermined operator within a loop in said stream of computer instructions, said first predetermined operator allocating an unallocated portion of said memory space upon execution;

if said first predetermined operator is present, determining the value of a parameter following said first operator in said stream;

interposing a second operator within said loop in place of said first operator by said executable module; and reusing the same allocated portion of said memory space to store an instance of said parameter in said allocated portion of said memory space in response to the execution of said second operator during each iteration of said loop, wherein said allocated portion of said memory space is reused as multiple instances of said parameter are created without allocating a new memory space for each said new instance of said parameter.

* * * * *